(12) United States Patent
Skaurud

(10) Patent No.: US 7,520,533 B1
(45) Date of Patent: Apr. 21, 2009

(54) SEAT BELT CONTROLLED IGNITION SYSTEM

(76) Inventor: Orin Skaurud, 1912 Times Square Way, West Fargo, ND (US) 58078

( * ) Notice: Subject to any disclaimer, the term of this patent is extended or adjusted under 35 U.S.C. 154(b) by 0 days.

(21) Appl. No.: 12/200,655

(22) Filed: Aug. 28, 2008

(51) Int. Cl.
*B60R 22/00* (2006.01)

(52) U.S. Cl. .......................... 280/808; 701/45; 297/468; 307/10.3

(58) Field of Classification Search ................. 280/808; 701/45; 297/468, 469, 483; 307/10.3, 10.6, 307/328
See application file for complete search history.

(56) References Cited

U.S. PATENT DOCUMENTS

| | | | | |
|---|---|---|---|---|
| 3,840,849 | A * | 10/1974 | Lohr ........................ | 340/457.1 |
| 7,028,802 | B2 * | 4/2006 | Tobata ........................ | 180/268 |
| 7,359,781 | B2 * | 4/2008 | Foo et al. ..................... | 701/45 |
| 2004/0060762 | A1 * | 4/2004 | Tobata ........................ | 180/268 |
| 2005/0096818 | A1 * | 5/2005 | Fukuda et al. ................ | 701/45 |
| 2005/0149242 | A1 * | 7/2005 | Pavlish ........................ | 701/45 |
| 2008/0119990 | A1 * | 5/2008 | Fujimoto et al. ............. | 701/45 |
| 2008/0264710 | A1 * | 10/2008 | Odate et al. ................ | 180/268 |

* cited by examiner

*Primary Examiner*—Toan C To
(74) *Attorney, Agent, or Firm*—Intellipex PLLC; Jay Schloff

(57) ABSTRACT

Disclosed is a seat belt controlled ignition system for supplying power from a power source of an automobile to an ignition switch of the automobile. The seat belt controlled ignition system includes a seat belt and an electric circuit. The seat belt has a first strap member and a second strap member that are capable of being detachably attached with each other. Further, the electric circuit includes a switch mechanism disposed on at least one of the first strap member and the second strap member. Furthermore, the electric circuit is adapted to electrically connect the power source and the ignition switch. Upon detachably attaching the first strap member with the second strap member, the switch mechanism electrically connect the power source and the ignition switch, thereby supplying power from the power source of the automobile to the ignition switch of the automobile.

5 Claims, 2 Drawing Sheets

SEAT BELT CONTROLLED IGNITION SYSTEM

FIELD OF THE INVENTION

The present invention relates to a safety system in an automobile, and, more particularly, to a safety system in which an ignition system of an automobile is compatible with a seat belt system of the automobile to promote the seat belt usage for operating an automobile.

BACKGROUND OF THE INVENTION

Keeping safety measures in mind, generally, seat belts are provided in an automobile for securing an occupant on a seat of the automobile. Conventional seat belts are generally designed to secure the occupant against injuries that may result from sudden movements or accidents of the automobile. More often than not, many occupants may forget to fasten the conventional seat belts while driving. Some other occupants may refuse to fasten the conventional seat belts while driving. Such negligence of forgetting or refusing to fasten the conventional seat belt may lead to serious injuries to the occupants in case of the sudden movements or the accidents of the automobile.

Accordingly, there exists a need of a safety system that encourages the occupants to fasten the conventional seat belts for operating an automobile, to avoid serious injuries that may cause during sudden movements or accidents of the automobile.

SUMMARY OF THE INVENTION

In view of the foregoing disadvantages inherent in the prior art, the general purpose of the present invention is to provide a seat belt controlled ignition system configured to include all the advantages of the prior art, and to overcome the drawbacks inherent therein.

An object of the present invention is to provide a seat belt controlled ignition system that is capable of promoting usage of a seat belt to avoid serious injuries that may cause due to sudden movements or accidents while driving the automobile.

To achieve the above object, in an aspect of the present invention, a seat belt controlled ignition system for supplying power from a power source of an automobile to an ignition switch of the automobile is provided. The seat belt controlled ignition system comprises a seat belt and an electric circuit. The seat belt includes a first strap member and a second strap member. The first strap member and the second strap member are capable of detachably attaching with each other. Further, the electric circuit includes a switch mechanism disposed on at least one of the first strap member and the second strap member of the seat belt. Furthermore, the electric circuit is adapted to electrically connect the power source and the ignition switch of the automobile. When the first strap member and the second strap are detachably attached to each other, the switch mechanism electrically connects the power source and the ignition switch. This electrical connection supply power from the power source to the ignition switch of the automobile to start the automobile.

This together with other aspects of the present invention, along with the various features of novelty that characterize the present invention, is pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular seat belt controlled ignition system, as shown and described. It is understood that various omissions and substitutions of equivalents are contemplated as circumstances may suggest or render expedient, but these are intended to cover the application or implementation without departing from the spirit or scope of the claims of the present invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present invention provides a seat belt controlled ignition system for supplying power from a power source of an automobile to an ignition switch of the automobile. More particularly, the seat belt controlled ignition system supply the power from the power source to the ignition switch only when a seat belt of the automobile is fastened. The seat belt controlled ignition system is capable of promoting the seat belt usage for operating the automobile. The term "operating the automobile" used herein refers to starting as well as driving the automobile. Usage of the seat belt while operating the automobile avoids serious injuries that may cause during sudden movements or accidents of the automobile.

Figure 1:
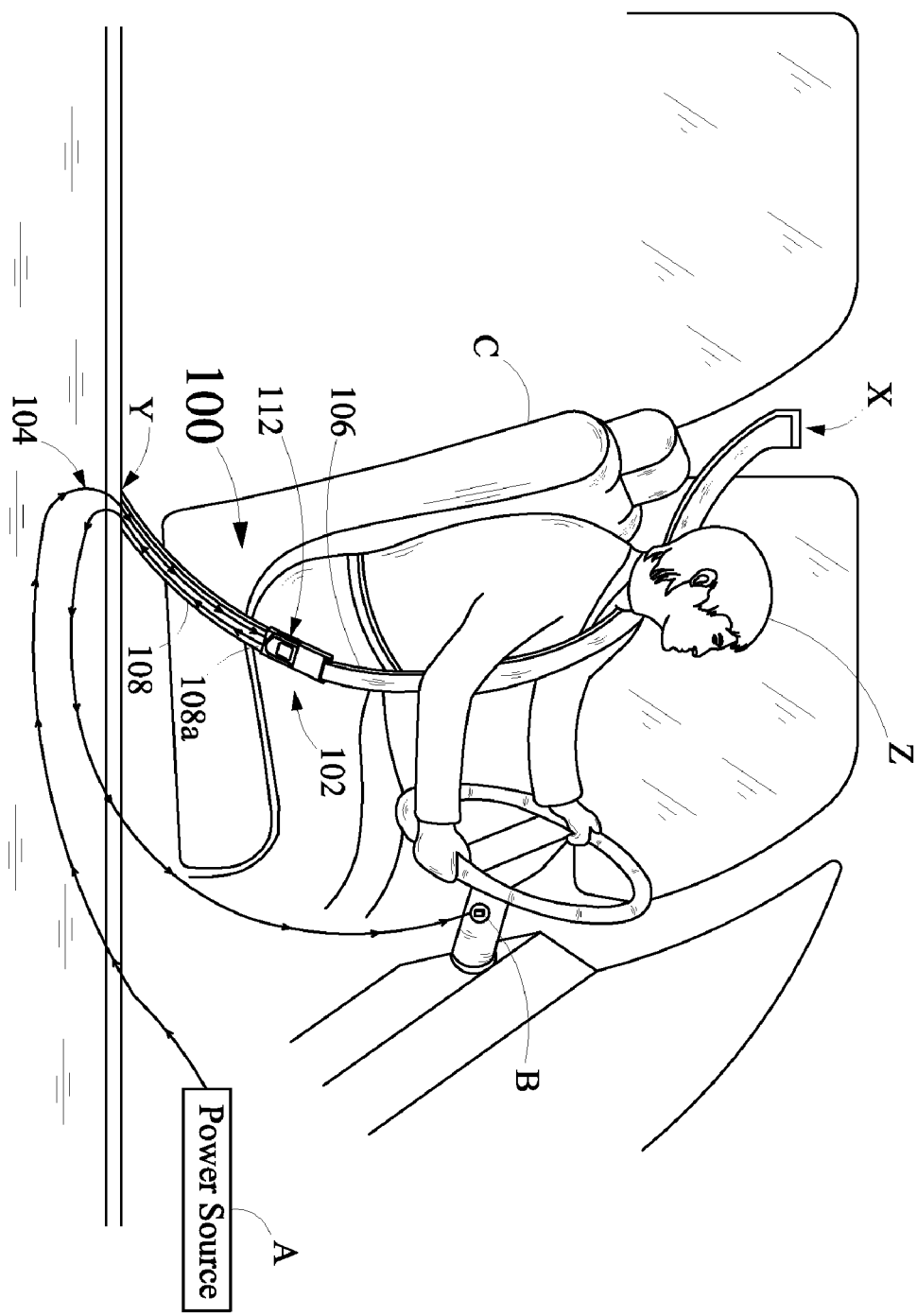
FIG. 1 illustrates an environment in which a seat belt controlled ignition system is utilized, according to an exemplary embodiment of the present invention.

Referring now to FIG. 1, an environment in which a seat belt controlled ignition system 100 is illustrated in a utilized state, according to an exemplary embodiment of the present invention. The seat belt controlled ignition system 100 is adapted to supply power from a power source 'A' of an automobile (not shown) to an ignition switch 'B' of the automobile. The seat belt controlled ignition system 100 includes a seat belt 102 and an electric circuit 104. The seat belt 102 includes a first strap member 106 and a second strap member 108. The first strap member 106 is secured to an interior portion 'X', above a seat 'C', of the automobile. Further, the second strap member 108 is secured to an interior portion 'Y', adjacent to the seat 'C', of the automobile. The first strap member 106 and the second strap member 108 are capable of detachably attaching with each other. The detachable attachment of the first strap member 106 with the second strap member 108 is described in detail with reference to FIG. 2.

Figure 2:
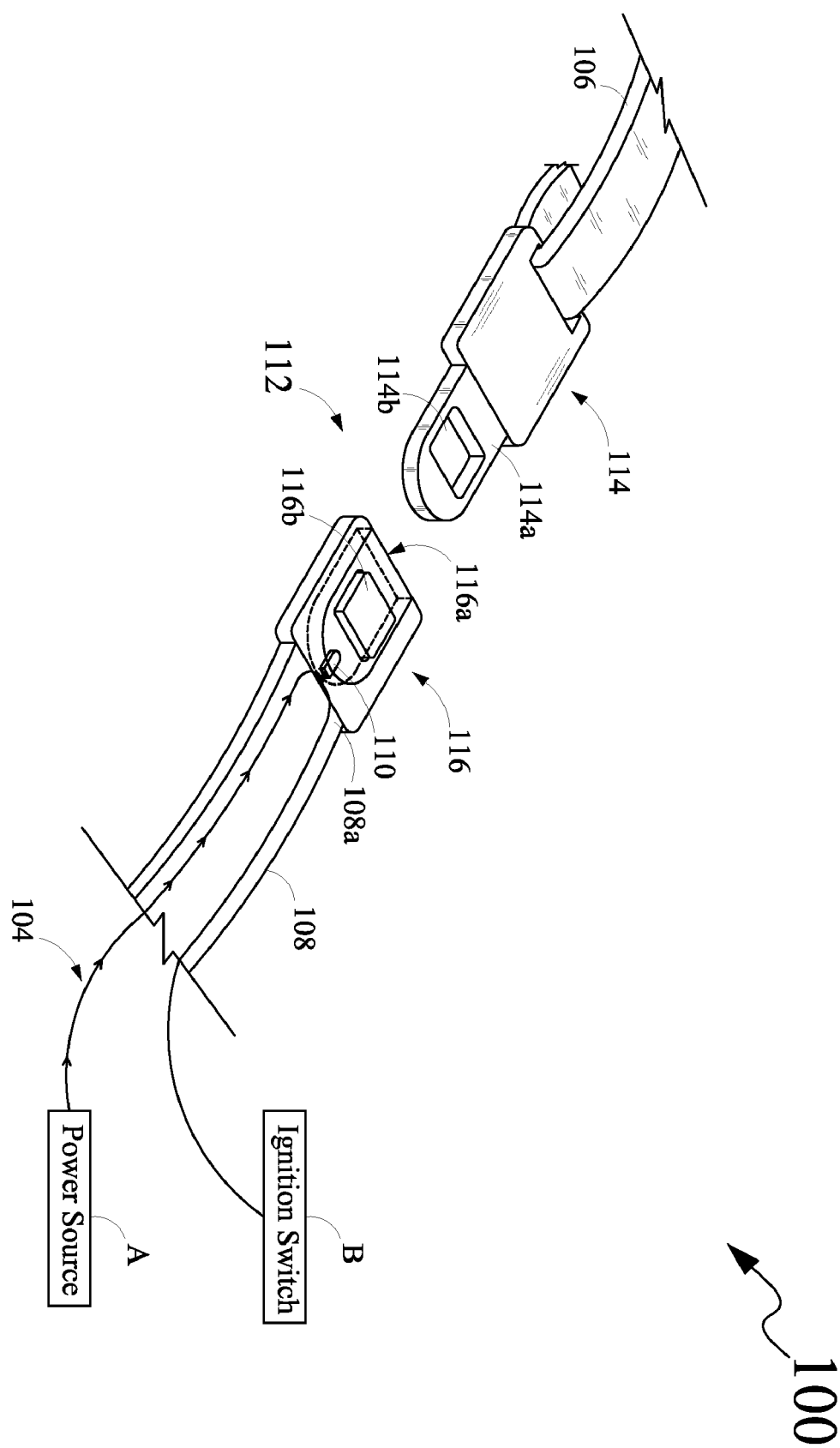
FIG. 2 illustrates a schematic diagram of a seat belt controlled ignition system, according to an exemplary embodiment of the present invention.

Referring now to FIG. 2, a schematic diagram of the seat belt controlled ignition system 100 is illustrated, according to an exemplary embodiment of the present invention and described in conjunction with FIG. 1. As shown in FIG. 2, the electric circuit 104 includes a switch mechanism 110 capable of being disposed on at least one of the first strap member 106 and the second strap member 108 of the seat belt. In the present embodiment, the switch mechanism 110 is disposed on the second strap member 108 of the seat belt 102.

The electric circuit 104 is capable of electrically connecting and disconnecting the power source 'A' and the ignition switch 'B' with the help of the switch mechanism 110. More particularly, the electric circuit 104 extends from the second strap member 108 for electrically coupling the power source 'A' and the ignition switch 'B'. Further, the switch mechanism 110 is disposed on the second strap member 108, and is electrically coupled to the electric circuit 104 in between the power source 'A' and the ignition switch 'B'. Accordingly, upon attaching the first strap member 106 and the second strap member 108, the switch mechanism 110 closes the electric circuit 104 for electrically connecting the power source 'A' and the ignition switch 'B' for starting the automobile. Further, upon detaching the first strap member 106 and the second strap member 108, the switch mechanism 110 opens the electric circuit 104 for disconnecting supply of the power from the power source 'A' to the ignition switch 'B'.

The first strap member 106 and the second strap member 108 of the seat belt 102 are detachably attached with each other by an attaching mechanism 112, as shown in FIG. 2. More specifically, the attaching mechanism 112 is shown in a detached fashion in FIG. 2. In one embodiment of the present invention, the attaching mechanism 112 is a press-fit arrangement. The attaching mechanism 112 includes a first element 114 and a second element 116. The first element 114 is slidably secured to the first strap member 106 of the seat belt 102. More specifically, the first element 114 is configured to slidably run along the first strap member 106 due to slidable coupling therebetween. The second element 116 is secured at an end portion 108a of the second strap member 108 of the seat belt 102. The first element 114 is press fit into the second element 116 for detachably attaching with each other.

The first element 114 includes a projection 114a and an opening 114b configured on the projection 114a. The second element 116 includes a cavity 116a configured within the second element 116. The cavity 116a is capable of receiving the projection 114a. Moreover, the second element 116 includes a spring loaded projection member 116b accommodated in the cavity 116a of the second element 116. More specifically, the spring loaded projection member 116b is coupled to a bottom surface of the second element 116 and extends from the cavity 116a to a top surface of the second element 116. The cavity 116a is capable of receiving the projection 114a therein upon press fitting the first element 114 into the second element 116. Further, the spring loaded projection member 116b fits in the opening 114b for detachably attaching the first element 114 with the second element 116.

The second element 116 of the attaching mechanism 112 accepts the switch mechanism 110 therein. The switch mechanism 110 may be switched 'ON' and switched 'OFF' by, respectively, press fitting and releasing the first element 114 and the second element 116. Particularly, upon press fitting the first element 114 into the second element 116, the switch mechanism 110 is switched 'ON' to electrically connect the power source 'A' and the ignition switch 'B'. Moreover, upon press fitting the first element 114 and the second element 116 an occupant 'Z' (see FIG. 1) is secured on the seat 'C' (see FIG. 1) of the automobile. Accordingly, both the switching 'ON' of the switch mechanism 110 for supplying the power to the ignition switch 'B', and securing the occupant 'Z' on the seat 'C' are compatible to each other. Further, upon releasing the first element 114 and the second element 116 of the attaching mechanism 112, the switch mechanism 110 is switched 'OFF' to disconnect the power supply from the power source 'A' to the ignition switch 'B'.

In a scenario where the occupant 'Z' has not fastened the first strap member 106 and the second strap member 108 of the seat belt 102, the occupant 'Z' will not be able to start the automobile because the power source 'A' and the ignition switch 'B' are not electrically connected to each other. Further, the ignition will not start unless the seat belt 102 is fastened by the occupant 'Z' in the automobile. Accordingly, the occupant 'Z', in any case, will not be able to forget or refuse to fasten the seat belt 102. This feature of the seat belt controlled ignition system 100 promotes usage of the seat belt 102 for starting the automobile.

Further, in one embodiment, the seat belt controlled ignition system 100 may include a sensing means (not shown) for detecting a fastened and unfastened condition of the seat belt 102. The sensing means, upon sensing the unfastened condition of the seat belt 102 causes an engine of the automobile to decelerate. For example, in one embodiment of the present invention, a speed of the automobile may decelerate with a rate of about 20 to 30 mph on sensing the unfastened condition of the seat belt 102. The sensing means ensures safety of the occupant 'Z' by promoting the occupant 'Z' to fasten the seat belt 102, while driving the automobile.

The seat belt controlled ignition system 100 of the present invention is advantageous in promoting a seat belt usage for operating the automobile. Usage of the seat belt while operating the automobile avoids serious injuries that may cause during sudden movements or accidents of the automobile.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

What is claimed is:

1. A seat belt controlled ignition system for supplying power from a power source of an automobile to an ignition switch of the automobile, the seat belt controlled ignition system comprising:

a seat belt having a first strap member and a second strap member, the first strap member and the second strap member capable of detachably attaching with each other; and an electric circuit having a switch mechanism disposed on at least one of the first strap member and the second strap member, the electric circuit adapted to electrically connect the power source and the ignition switch, wherein upon detachably attaching the first strap member with the second strap member, the switch mechanism electrically connects the power source and the ignition switch, thereby supplying power from the power source of the automobile to the ignition switch of the automobile.

2. The seat belt controlled ignition system of claim 1, further comprising an attaching mechanism having a first element and a second element, the first element slidable secured to the first strap member, and the second element is secured to the second strap member, wherein the first element and the second element of the attaching mechanism is capable of detachably attaching the first strap member and the second strap member of the seat belt.

3. The seat belt controlled ignition system of claim 2, wherein the switch mechanism is disposed on at least one of the first element and the second element of the attaching mechanism.

4. The seat belt controlled ignition system of claim 2, wherein the attaching mechanism is a press fit arrangement.

5. The seat belt controlled ignition system of claim 1, further comprising a sensing mean electrically coupled to the electric circuit for sensing detachment of the first strap member and the second strap member of the seat belt.

* * * * *